United States Patent
Bates et al.

(10) Patent No.: US 6,247,043 B1
(45) Date of Patent: Jun. 12, 2001

(54) APPARATUS, PROGRAM PRODUCTS AND METHODS UTILIZING INTELLIGENT CONTACT MANAGEMENT

(75) Inventors: Cary Lee Bates; Paul Reuben Day, both of Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/096,243

(22) Filed: Jun. 11, 1998

(51) Int. Cl.$^7$ .................................................. G06F 19/00
(52) U.S. Cl. ............................................ 709/200; 709/206
(58) Field of Search ................................... 709/203, 206, 709/200; 707/3–5, 10

(56) References Cited

U.S. PATENT DOCUMENTS

| | | | |
|---|---|---|---|
| 5,870,744 | * | 2/1999 | Sprague .................................... 707/9 |
| 5,913,032 | * | 6/1999 | Schwartz et al. ..................... 709/213 |
| 5,999,932 | * | 12/1999 | Paul ...................................... 707/10 |
| 6,026,396 | * | 2/2000 | Hall ......................................... 707/4 |

OTHER PUBLICATIONS

Robert Kass et al., "Intelligent Assistance for the Communication of Information in Large Organizations," Proceedings of the Eighth Conference on Artificial Intelligence for Application CAIA, pp. 171–178, 1992.*

Thomas Malone et al., "The Information Lens: An Intelligent System for Information Sharing and Coordination," (M.H. Olsen (Ed.)) Technological Support for Work Group Collaboration, pp. 65–88, 1989.*

* cited by examiner

*Primary Examiner*—Paul V. Kulik
(74) *Attorney, Agent, or Firm*—Wood, Herron & Evans, L.L.P.

(57) ABSTRACT

Apparatus, program products, and methods implement various intelligent contact management operations to improve the productivity of users of electronic messaging systems and the like. To perform an intelligent name lookup, for example, a subset of the users in a contact database that meet a predetermined search criteria is identified, and a favored user is selected therefrom based upon a predetermined affinity criteria. Also, the automated addition of new entries to a contact database is supported by accumulating the number of contacts between a first user and a second user, with a new entry associated with the second user added to the contact database associated with the first user in response to the number of contacts between the first and second users exceeding a predetermined threshold. The automated addressing of electronic messages is also supported by determining, in response to a first user addressing an electronic message to a second user, whether the second user is a member of an electronic messaging group that defines a plurality of member users, and if so, to address the electronic message to at least one additional member user in the electronic messaging group. The automated creation of electronic messaging groups is also supported by addressing an electronic message to a plurality of recipient users in response to user input, and automatically creating a new electronic messaging group including the plurality of recipient users. Furthermore, the automated updating of electronic messaging groups is supported by addressing an electronic message to an electronic messaging group including a plurality of member users in response to user input, selectively updating an address list for the electronic message in response to user input, and selectively updating the electronic messaging group based upon the updates to the address list.

8 Claims, 9 Drawing Sheets

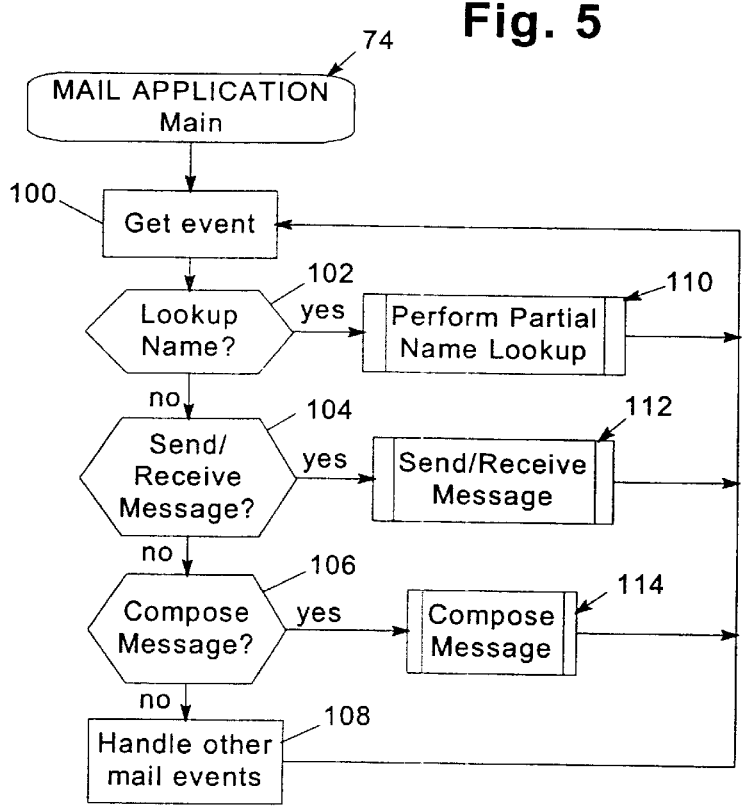
Fig. 5
Fig. 6
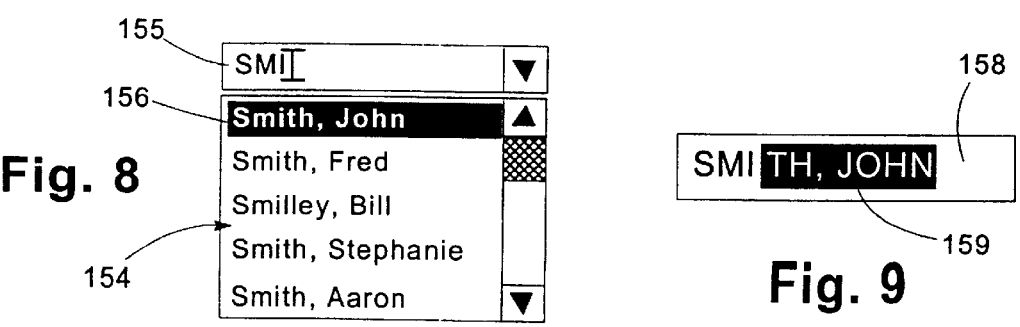
Fig. 8
Fig. 9

APPARATUS, PROGRAM PRODUCTS AND METHODS UTILIZING INTELLIGENT CONTACT MANAGEMENT

FIELD OF THE INVENTION

The invention is generally related to computers and computer software. More specifically, the invention is related to contact management in electronic messaging systems and the like.

BACKGROUND OF THE INVENTION

Electronic messaging has dramatically changed the manner in which people communicate with one another in the digital age. Electronic messaging systems, for example, permit users on different computers to communicate with one another by transmitting information such as text messages and the like between the different computers. Electronic messaging is often used to permit employees in a company to communicate with other employees connected to the company's internal network, regardless of whether they are in the same or another company facility. Also, due to the explosive growth of the Internet, electronic messaging has now become a relatively common way for anyone with a computer to communicate with other computer users all over the world.

In most electronic messaging systems, users are assigned user identifiers, or "user id's" that uniquely identify each user. Furthermore, each user is typically assigned one or more "mailboxes," (also referred to as "post office boxes") that have a unique address so that any user wishing to send an electronic message (often referred to as an "e-mail") to another user can do so by addressing the electronic message to the mailbox assigned to that user.

Many electronic messaging systems furthermore keep electronic "address books," which typically include contact databases within which are stored records of the mailbox addresses for different users. Therefore, for example, a user wishing to send an electronic message to a user named John Smith, whose mailbox address is "smithj@xyz.com", is then able to search through an address book to find an entry for "Smith, John", rather than having to remember a relatively cryptic mailbox address that is assigned to that user.

Some address books also store additional information about users, such as telephone numbers, mailing addresses, job titles, and other information that is more or less unrelated to electronic messaging. Moreover, such address books have also been integrated with other personal information management (PIM) tools such as electronic calendars, to-do lists, project planners, and meeting scheduling tools. One type of electronic messaging system, known as "groupware", tightly integrates all of these functions together to enable users that work together to collaborate more effectively with one another.

An address book is often referred to as a "contact manager," as a user is capable of using an address book to maintain a wide variety of information about many different people (referred to in this context as "contacts"). As the use of electronic messaging has become more widespread, many computer users send and receive more electronic messages to and from a larger number of other computer users. Contact management therefore becomes more important for these users so that they can accurately keep track of other users with whom they correspond.

Particularly in many groupware systems, a global or master address book is maintained on a central computer for shared access by all users of such a system. A global address book typically includes information Rout all users of the system, and may include hundreds or thousands of records for larger organizations.

Any individual user often may also keep a local address book that contains only the users with which that user regularly corresponds. However, whenever that user wishes to correspond with another user that is not in his or her local address book, the user often must search through the global address book to find the mailbox address for the other user (a process referred to as "name lookup"), which can be relatively time consuming in a large global address book that is shared by many users.

Some systems also permit a process known as "partial" name lookup to permit a search to be performed concurrently with a user typing in the name of a user to locate in an address book. Often, the partial name lookup processes searches first for matching entries in a use's local address book, and if none are found, searches for matching entries in a global address book. For example, as a user types in the name "Smith, John", a partial name lookup process would retrieve all address book entries that start with a user name "s" after the user typed the letter "s", then retrieve only the address book entries that start with the user name "sm" after the user typed the letter "m", etc. Eventually, the user would be left with a relatively manageable list of entries to select from as the intended recipient of an electronic message.

Particularly with large global address books, partial name lookup can be somewhat time consuming, so it is often desirable to locate a desired recipient with a minimum number of input characters. However, one problem associated with the search processes for conventional address books is that such processes typically order search results alphabetically. Therefore, for example, if a user is attempting to locate the entry for "Smith, John" in an address book that contains entries for users such as "Smith, Aaron", "Smith, Betty", "Smith, Fred", "Smith, John", "Smith, Joseph", and "Smith, Stephanie", a user typing in the letters "smith" would be presented with an alphabetically-arranged list of these users.

The searching user may have worked with John Smith many times before, and may have never even met any of the other users. Or, for example, the searching user and John Smith may be located in the same office building, or may both be engineers, while the other users are located in other facilities or are managers, assembly line workers, lawyers, etc. Nonetheless, the searching user still receives an alphabetical list, and he or she must scan down through the list of users before selecting the desired entry. Conventional electronic messaging systems lack any capability to suggest any particular entry from a list of search results on any basis other than alphabetically.

Some electronic messaging systems also provide the ability to automatically add an entry to a user's local address book in response to receiving an electronic message from another user. However, many users receive literally hundreds of electronic messages a day, with many coming from other users that a particular user has no intention of ever corresponding with again. Creating an entry for each and every user that sends a message can significantly clutter up a user's local address book and make it more difficult for the user to locate specific entries. Moreover, a user may be required to periodically sweep through his or her local address book and remove all useless entries—a process that can be wasteful and time consuming.

Many electronic messaging systems further permit users to be grouped together into "groups" that can be separately named and utilized to send electronic messages to multiple users at once. However, management of groups can become somewhat burdensome, as a user is typically required to manually create the groups by locating and adding each desired user to the groups. Furthermore, unless the user can remember the particular name assigned to a group, the user must either perform a search for the group or manually address an electronic message to each member of the group individually. These additional steps often distract a user and consume additional time, thereby decreasing a user's productivity.

It should therefore be appreciated that the contact management capabilities of many conventional electronic messaging systems are significantly limited and can often have a negative impact on user productivity. Therefore, a significant need has arisen for a manner of improving electronic messaging systems to provide for more intelligent and useful contact management.

SUMMARY OF THE INVENTION

The invention addresses these and other problems associated with the prior art by providing apparatus, program products, and methods that implement various intelligent contact management operations to improve the productivity of users of electronic messaging systems and the like.

Consistent with one aspect of the invention, intelligent name lookup functionality may be supported to facilitate location of a user from a contact database such as an address book or the like. In particular, a particular user may be suggested among multiple possible candidates by recognizing that some users may have a greater "affinity" to a particular user than to other users, and thus, may be more likely to be the intended subjects of a name lookup operation. For example, two users that have corresponded with one another in the past may be considered to have a greater affinity than two users that have not. Similarly, two users that work in the same facility or in the same building, or that both have the same type of job, likely have a greater affinity than two users that are located in other facilities or that perform vastly different jobs. By identifying one or more of these characteristics of possible candidates, often a relatively intelligent suggestion may be made as to which of such candidates is the likely lookup target for a particular user.

Intelligent name lookup consistent with the invention identifies a subset of the users in a contact database that meet a predetermined search criteria. A favored user is selected therefrom based upon a predetermined affinity criteria. Furthermore, a display representation associated with the favored user is displayed. As a result, a user may be presented with a suggested user among the multiple identified users, thereby providing more helpful search results and potentially shortening the time required to locate a particular user stored in the contact database.

Consistent with another aspect of the invention, intelligent contact database management functionality may also be supported to facilitate the automated addition of new entries to the contact database for a given user. In particular, consistent with the invention the number of contacts between a first user and a second user are accumulated, and a new entry associated with the second user is added to the contact database associated with the first user in response to the number of contacts between the first and second users exceeding a predetermined threshold. It is anticipated that requiring a threshold to be exceeded prior to automatically adding any entry in a contact database may result in a higher probability that such added entries are meaningful and helpful to a user.

Consistent with another aspect of the invention, additional functionality may be supported to facilitate the use of electronic messaging groups. In particular, automated addressing of electronic messages may be provided, whereby, in response to a first user addressing an electronic message to a second user, a determination is made whether the second user is a member of an electronic messaging group that defines a plurality of member users. If the second user is a member of the electronic messaging group, the electronic message is addressed to at least one additional member user in the electronic messaging group.

Consistent with a further aspect of the invention, additional functionality may be supported to facilitate the management of electronic messaging groups. In particular, the automated creation of electronic messaging groups may be provided, whereby an electronic message is addressed to a plurality of recipient users in response to user input, and a new electronic messaging group is automatically created including the plurality of recipient users. Also, the automated updating of electronic messaging groups may be provided, whereby an electronic message is addressed to an electronic messaging group including a plurality of member users in response to user input, an address list for the electronic message is selectively updated in response to user input, and the electronic messaging group is selectively updated based upon the updates to the address list.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIG. 5 is a block diagram of a contact table from one of the contact databases in FIG. 3.

FIG. 6 is a flowchart illustrating the program flow of a main routine executed by a mail application in one of the client computers of FIG. 3.

FIG. 8 is a block diagram illustrating an exemplary multiple entry display representation of a favored entry consistent with the invention.

FIG. 9 is a block diagram illustrating an exemplary single entry display representation of a favored entry consistent with the invention.

DETAILED DESCRIPTION

Hardware and Software Environment

Figure 1:
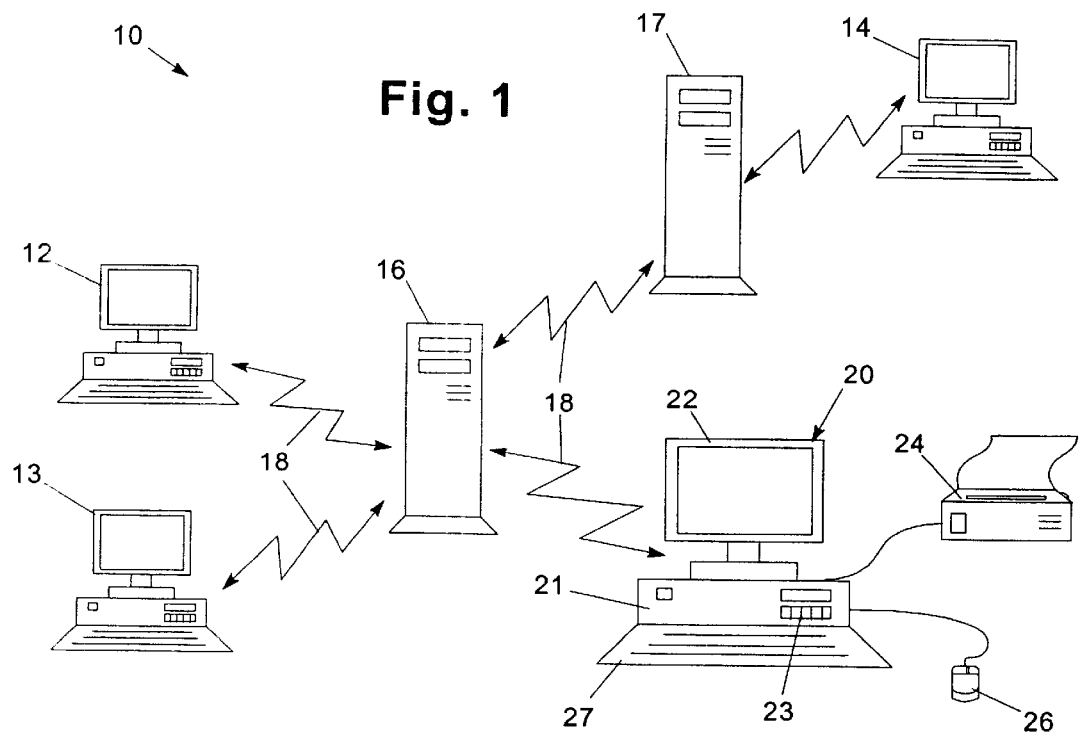
FIG. 1 is a block diagram of a computer system consistent with the invention.

Turning to the Drawings, wherein like numbers denote like parts throughout the several views, FIG. 1 illustrates a computer system 10 consistent with the invention. Computer system 10 is illustrated as a networked computer system including one or more client computers 12, 13, 14 and 20 (e.g., desktop or PC-based computers, workstations, etc.) coupled to one or more servers 16, 17 (e.g., PC-based servers, minicomputers, midrange computers, mainframe computers, etc.) through a network 18. Network 18 may represent practically any type of networked interconnection, including but not limited to local-area, wide-area, wireless, and public networks (e.g., the Internet), and combinations thereof. Moreover, any number of computers and other electronic devices may be networked through network.

Client computer 20, which may be similar to computers 12, 14, may include a central processing unit (CPU) 21; a number of peripheral components such as a computer display 22; a storage device 23; a printer 24; and various input devices (e.g., a mouse 26 and keyboard 27), among others. Server computers 16 and 17 may be similarly configured, albeit typically with greater processing performance and storage capacity, as is well known in the art.

Figure 2:
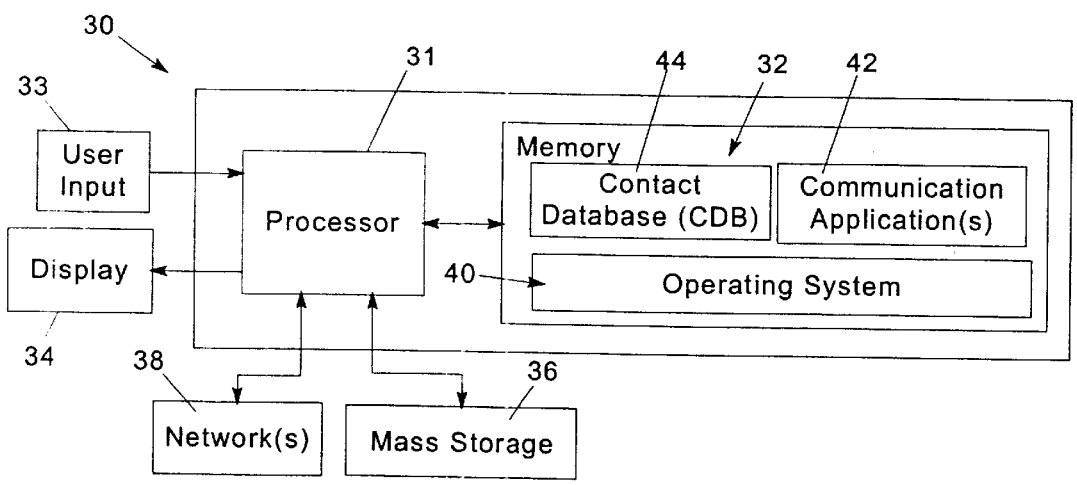
FIG. 2 is a block diagram of an exemplary hardware and software environment consistent with the invention.

FIG. 2 illustrates in another way an exemplary hardware and software environment for an apparatus 30 consistent with the invention. For the purposes of the invention, apparatus 30 may represent practically any type of computer, computer system or other programmable electronic device, including a client computer (e.g., similar to computers 12, 13, 14 and 20 of FIG. 1), a server computer (e.g., similar to servers 16 and 17 of FIG. 1), a portable computer, an embedded controller, etc. Apparatus 30 may be coupled in a network as shown in FIG. 1, or may be a stand-alone device in the alternative. Apparatus 30 will hereinafter also be referred to as a "computer", although it should be appreciated the term "apparatus" may also include other suitable programmable electronic devices consistent with the invention.

Computer 30 typically includes at least one processor 31 coupled to a memory 32. Processor 31 may represent one or more processors (e.g., microprocessors), and memory 32 may represent the random access memory (RAM) devices comprising the main storage of computer 30, as well as any supplemental levels of memory, e.g., cache memories, non-volatile or backup memories (e.g., programmable or flash memories), read-only memories, etc. In addition, memory 32 may be considered to include memory storage physically located elsewhere in computer 30, e.g., any cache memory in a processor 31, as well as any storage capacity used as a virtual memory, e.g., as stored on a mass storage device 36 or on another computer coupled to computer 30 via network 38.

Computer 30 also typically receives a number of inputs and outputs for communicating information externally. For interface with a user or operator, computer 30 typically includes one or more user input devices 33 (e.g., a keyboard, a mouse, a trackball, a joystick, a touchpad, and/or a microphone, among others) and a display 34 (e.g., a CRT monitor, an LCD display panel, and/or a speaker, among others). It should be appreciated, however, that with some implementations of computer 30, e.g., some server implementations, direct user input and output may not be supported by the computer.

For additional storage, computer 30 may also include one or more mass storage devices 36, e.g., a floppy or other removable disk drive, a hard disk drive, a direct access storage device (DASD), an optical drive (e.g., a CD drive, a DVD drive, etc.), and/or a tape drive, among others. Furthermore, computer 30 may include an interface with one or more networks 38 (e.g., a LAN, a WAN, a wireless network, and/or the Internet, among others) to permit the communication of information with other computers coupled to the network. It should be appreciated that computer 30 typically includes suitable analog and/or digital interfaces between processor 31 and each of components 32, 33, 34, 36 and 38 as is well known in the art.

Computer 30 operates under the control of an operating system 40, and executes various computer software applications, components, programs, objects, modules, etc. (e.g., communication application 42 and contact database 44, among others). Moreover, various applications, components, programs, objects, modules, etc. may also execute on one or more processors in another computer coupled to computer 30 via a network 38, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions will be referred to herein as "computer programs", or simply "programs". The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, optical disks (e.g., CD-ROM's, DVD's, etc.), among others, and transmission type media such as digital and analog communication links.

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Those skilled in the art will recognize that the exemplary environments illustrated in FIGS. 1 and 2 are not intended to limit the present invention. Indeed, those skilled in the art will recognize that other alternative hardware and/or software environments may be used without departing from the scope of the invention.

Electronic Messaging with Intelligent Contact Management

As discussed above, the various embodiments of the invention implement several intelligent contact management features to improve the performance and usability of an electronic messaging system. One typical arrangement of an electronic messaging system implementation 50 is illustrated in greater detail in FIG. 3. Electronic messaging system 50 is distributed over one or more servers (e.g., servers 51, 52) and one or more clients (e.g., 54, 56 and 58 coupled to server 51, and clients 60 and 62 coupled to server 52). Server 51 includes a messaging manager application 64 coupled to a master contact database 66. The messaging manager application may be any form of server-based electronic messaging application, e.g., a mail or groupware server, among others. Moreover, master contact database 66 may be any form of database that maintains records of users of the electronic messaging system, e.g., a global address book or the like. Similarly, server 52 may include a messaging manager application 68 and a master contact database 70. It should be appreciated that typically databases 66, 70 contain the same information, and may be synchronized with one another to insure consistent information for applications 64, 68. In the alternative, only one master copy of the contact database may be utilized in one of servers 51, 52 with the other server accessing the common master database as necessary.

Servers 51, 52 are coupled over a logical connection. The servers may be disposed within the same facility and coupled via a local area network (LAN), or may disposed at different facilities or other locations and coupled via a logical connection such as a wide area network (WAN) or the Internet.

Figure 3:
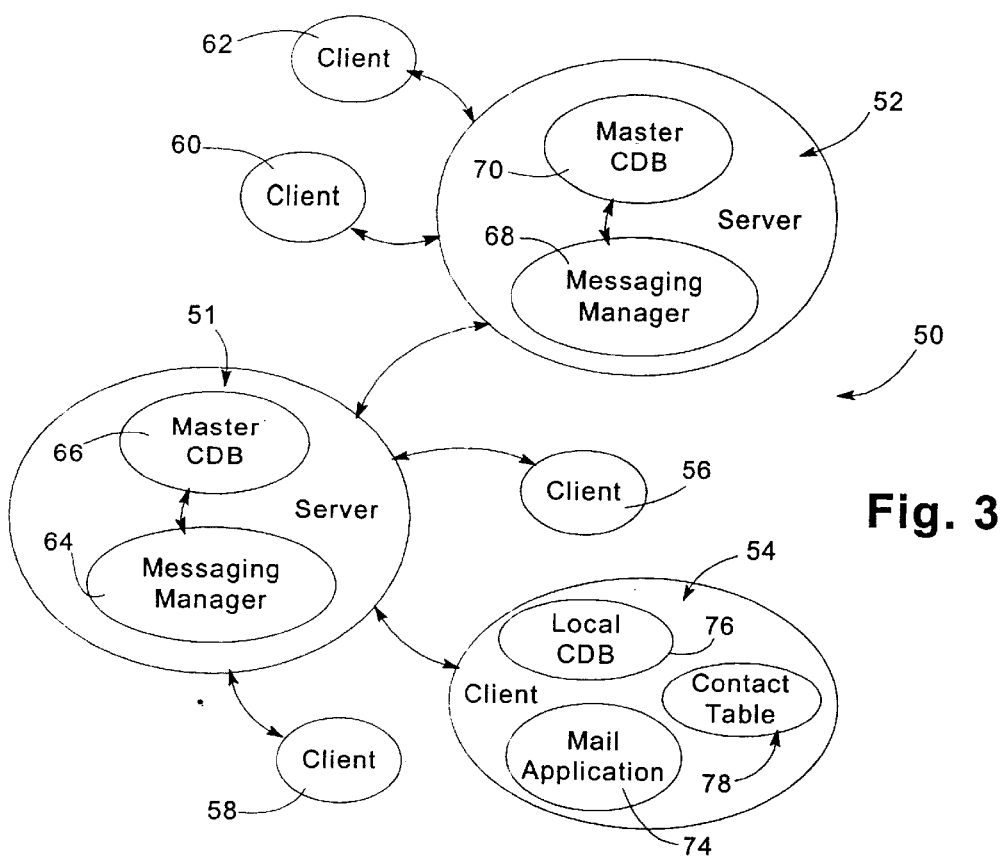
FIG. 3 is a block diagram illustrating the primary software components in an electronic messaging system consistent with the invention.

Each client 54–62 is typically coupled to one or both of servers 51, 52 through a suitable logical connection (e.g., over a LAN, a WAN or the Internet). It should be appreciated, however, that the logical connections illustrated in FIG. 3 are merely exemplary, as different numbers and/or arrangements of clients and servers may be present in an electronic messaging system consistent with the invention. Moreover, as illustrated by client 54, each client typically includes a mail application 74, a local contact database 76 and a contact table 78. The mail application may typically be any suitable messaging client for interfacing with the messaging manager applications in servers 51, 52. For example, if the electronic messaging system is based upon an Internet standard, such as the POP or IMAP standards, mail application 74 may be any known Internet-based email client. In the alternative, the electronic messaging system may rely on another standard or on a proprietary protocol.

Local contact database 76 in client 54 is typically a personal address book or other database that permits the user to maintain local records of other users of interest to that client. Typically, the local contact database includes a subset of the records of the master contact database, although if external messaging is supported to other users outside of the electronic messaging system (e.g., to other users over the Internet), the local contact database may also include other records that are not found in the master contact database.

Each client also includes a contact table 78 that stores a record of the number of "contacts" between the user of the client (also referred to herein as the "local user") and other users in the electronic messaging system. For reasons that will become more apparent below, the contact table maintains such information so that a contact affinity for different users may be readily obtained for use in various intelligent contact management functions.

Figure 4:
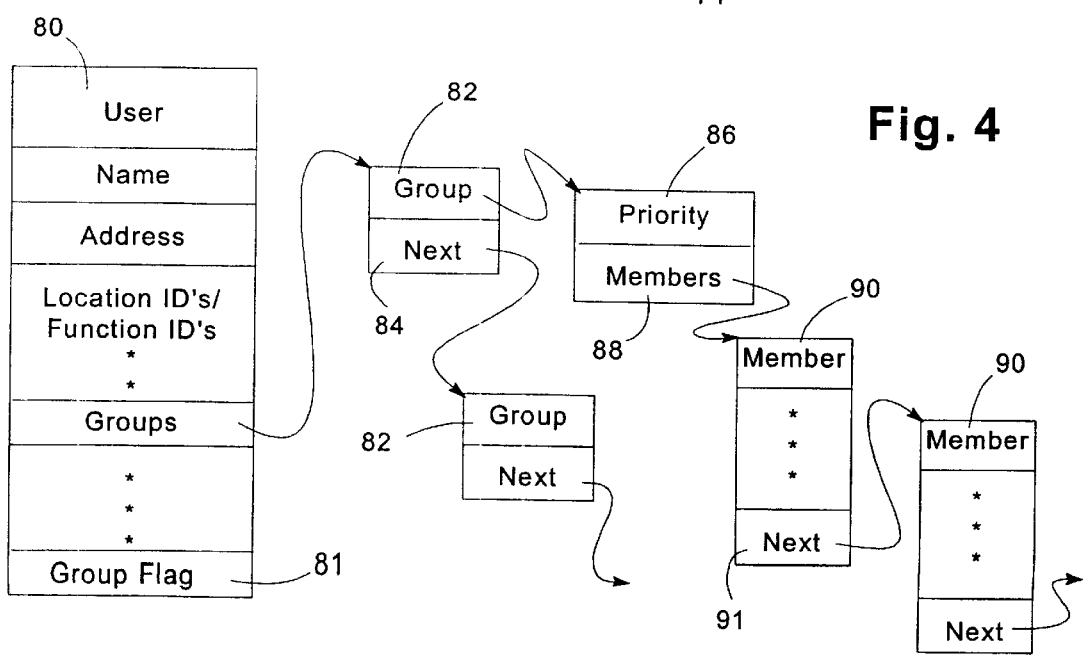
FIG. 4 is a block diagram of a contact database entry from one of the contact databases in FIG. 3.

An exemplary user entry 80 from one of the contact databases in electronic messaging system 50 is illustrated in greater detail in FIG. 4. Generally, user entry 80 includes a plurality of fields within which is maintained various information about the user. For example, a "name" field stores the user name for the user represented by entry 80, and an "address" field maintains the address of the user on the electronic messaging system.

Additional information about a user may also be maintained in entry 80, e.g., the user's office address, phone number, fax number, etc. Among this information, several "location" and "function" identifiers may be defined that are useful in determining the location and functional affinity of different users in the electronic messaging system.

The location affinity between two users may be based upon a number of factors that define the relatedness of two particular users. For example, a location identifier may include one or more of a facility identifier, a building identifier, a telephone number, an address, a zip code, a floor, a mail station, a network, a distance and a network domain, among others. Only one location identifier may be used to determine the location affinity between a pair of users, or in the alternative, multiple factors may be used in determining the location affinity between users. Moreover, when multiple location identifiers are used, it may be desirable to scale or prioritize different location identifiers relative to others to favor certain identifiers relative to others. Furthermore, as discussed in greater detail below with reference to FIG. 18, it may be desirable to track the contacts between different locations to determine whether two identifiers are related in some fashion other than being an exact match. For example, if a work group is distributed at multiple facilities, those facilities, while having different identifiers, may be related to one another for the purpose of intelligent contact management.

Functional affinity, which may be used to determine the relation between users based upon non-location information, may include a number of function identifiers, including department, job title, job family, shift, supervisor, and combinations thereof, among others. Function identifiers may also include key words that a user might use to identify himself or herself to other users on the system.

It should also be appreciated that location and/or function identifiers may either be based on existing fields in a user entry that are relied upon in a contact database, or may be specifically input by a particular user to customize such an entry. For example, in a local database copy of a particular user entry, the owner of the local contact database may desire to input additional information about a particular user so that user is favored for certain types of intelligent contact management functions. Other alternatives will be apparent to one of ordinary skill in the art.

Each user entry may also include a group flag 81 that indicates whether the entry is for a group, rather than an individual user. The use of flag 81 is discussed in greater detail with reference to FIG. 14.

Each user entry 80 also typically includes a "groups" pointer that points to a linked list of electronic messaging groups associated with that user. A linked list of group records 82, for example, may be defined, with each group record 82 including a next pointer 84 that points to the next group 82 in the linked list. Each group record 82 also includes a pointer to a group header including a priority field 86 and a members pointer 88. The priority field 86 may be used to store a relative priority for the group that is updated based upon the usage of each group so that one group that a particular user is a member of may be favored relative to other groups when a particular user is required to select among a plurality of such groups. The members pointer 88 points to a linked list of member records 90, each of which includes an identification of a member user, any additional information about that particular member, and a next pointer 91 that points to the next member record 90 in the group.

It should be appreciated that other data structures may be utilized to store user entry and/or group information consistent with the invention. For example, public and/or private groups may be accessible via the master and/or local contact databases. Separate group lists may be maintained for each user entry, or each user entry may share common groups via the pointers in group records 82, for example. Other modifications will be readily apparent to one of ordinary skill in the art.

As shown in FIG. 5, each client also maintains a contact table 78 that includes a plurality of table entries 92 for different users for which correspondence or other contacts have been made with the local user for a given client. Each entry includes a name field 94 that identifies a user, as well as a count field 96 and function field 98. The count field 96 maintains records of the number of contacts with the particular user represented by name field 94. The location and finction identifiers field 98 includes a list of the relevant location and/or function identifiers for a particular user. Field 98 typically maintains copies of such information from the user entries in the local contact database to facilitate lookup of location and/or functional affinity; however, it will be appreciated that field 98 may be omitted, whereby a determination of location or functional affinity may be based upon a search of user entries in a contact database. It should also be appreciated that alternate data structures may be utilized to maintain contact information in the alternative (e.g., maintaining contact information within each user entry, among others).

The operation of a main routine for a mail application 74 is illustrated in greater detail in FIG. 6. Generally, the routine is an event-based routine that retrieves events at block 100, determines at blocks 102, 104 and 106 whether the retrieved event corresponds to any of several events relative to an understanding of the invention, and if no such events are found, passes control to block 108 to handle other mail events conventionally handled by a mail application but which are not relevant to an understanding of the invention. It should be appreciated, however, that other models, e.g., procedural-based models, may be used in the alternative.

Three events that are relevant to an understanding of the intelligent contact management functions consistent with the invention are detected respectively in blocks 102, 104 and 106. Block 102 detects a "lookup name" event, and in response, diverts control to a perform partial name lookup routine 110. A "lookup name" event may be initiated, for example, in response to a user's request to retrieve a user's name from a local or global contact database. In addition, as will be discussed in greater detail below, routine 110 may also be initiated during composition of an electronic message, among other instances.

Another event, a "send/receive message" event, is detected in block 104 and handled by a send/receive message routine 112. This event is generally initiated in response to a user request to send any pending messages in a user's out box and retrieve from the server any messages sent by other users to that particular user.

Yet another event is a "compose message" event, which is detected by block 106 and handled by a compose message routine 114. The "compose message" event is generated in response to a user's desire to compose a new message to another user. Different variations of composing a message may be utilized, e.g., replying to another message, forwarding a message, or drafting a new message, among others.

Routines 110, 112 and 114 may be configured to perform several intelligent management functions consistent with the invention, as will become more apparent below. A first intelligent management function is that of intelligent name lookup, where a favored user may be located from a contact database based upon a predetermined affinity criteria. A second intelligent contact management function that may be supported is that of the automated addition of new entries to a contact database based upon the number of contacts between users. A third intelligent contact management function is that of automated addressing of electronic messages based upon user participation within electronic messaging groups. A fourth intelligent contact management function is that of the creation and/or maintenance of electronic messaging groups.

Each of the above-described intelligent contact management functions may be utilized separately or in conjunction with one or more of other such functions. Therefore, the invention should not be limited to the particular combination of functions described herein. Each intelligent management contact function will now be described separately herein.

Intelligent Name Lookup

Figure 7:
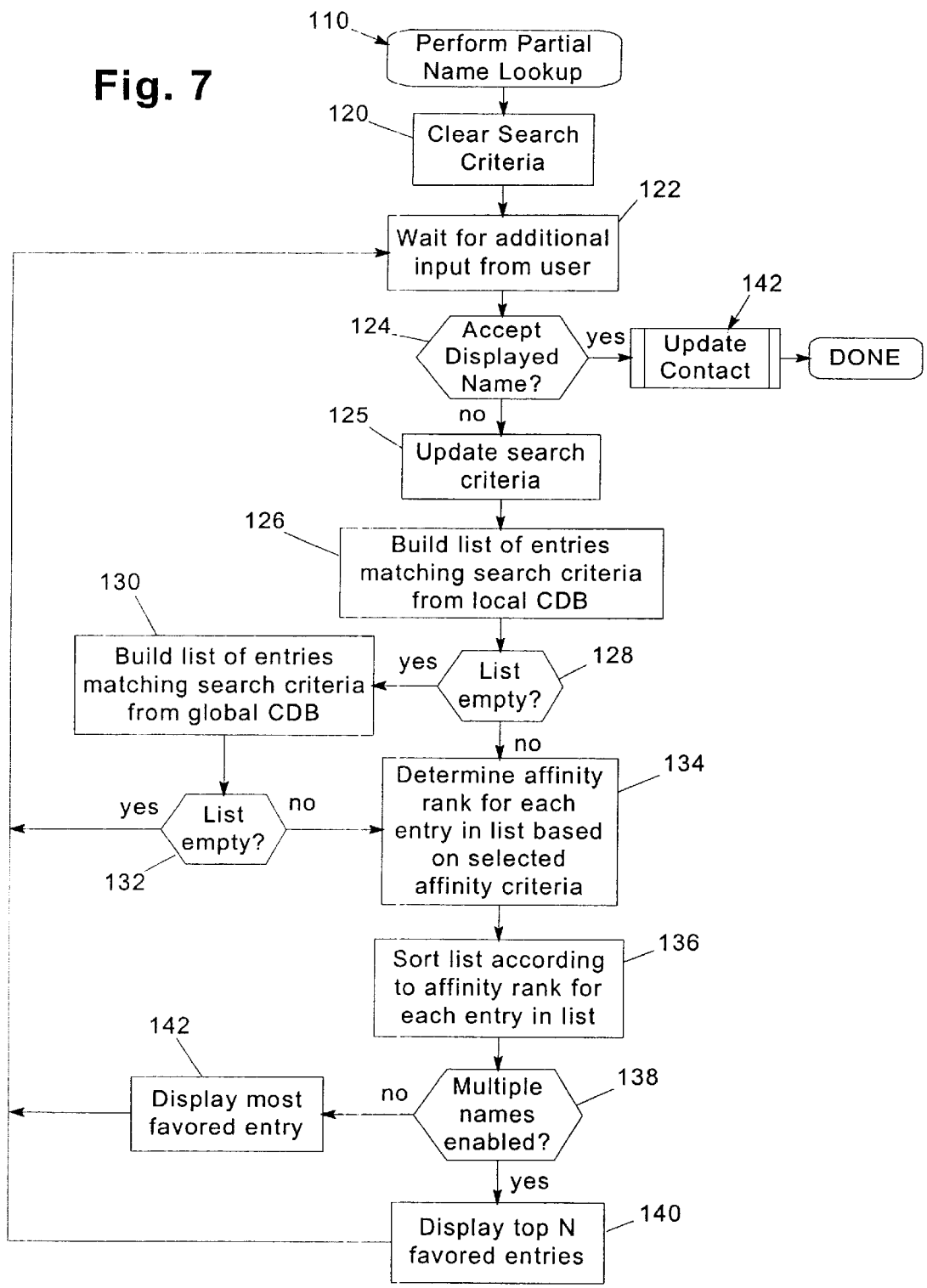
FIG. 7 is a flowchart illustrating the program flow of the partial name lookup routine of FIG. 6.

Intelligent name lookup consistent with the invention is typically implemented in a search routine, such as perform partial name lookup routine 110 of FIG. 7. With intelligent name lookup, a predetermined search criteria is utilized to select a subset of users from a contact database. Then, rather than organizing the search results based upon alphabetical ordering, one or more of the users in the subset are favored relative to others based upon a predetermined affinity criteria so that users having a greater affinity to the local user are highlighted relative to other users.

In addition, in the implementation illustrated herein, the search is performed on the basis of partial name lookup, whereby search results are retrieved as a user inputs the characters that form the predetermined search criteria, rather than requiring the user to type in a plurality of characters and then initiate the search. However, it should be appreciated that the principles of the invention also may be applied to other types of search algorithms in the alternative.

Routine 110 begins in block 120 clearing a search criteria defined for the local user. Next, in block 122, the system waits for additional input from a user, e.g., depression of a character or other key. Next, in block 124, it is determined whether the additional input indicates that the displayed name should be accepted, e.g., by a user depressing the "ENTER" key or depressing a toolbar button or other user interface control on a display. If the additional input is not a request to accept the displayed name, block 124 passes control to block 125 to update the search criteria based upon the additional user input. For example, if the user has depressed a character key, that character is appended to the search criteria. In the alternative, the user may perform other editing operations on the search criteria, e.g., by depressing the backspace key, highlighting a portion using a mouse pointer, etc., or by other mechanisms by which updates of the search criteria may be made. Next, block 126 builds a list of all entries that match the search criteria from the local contact database for the local user. It should be appreciated that searching a database based upon a search criteria is well known in the art, and thus, need not be discussed in greater detail herein.

Next, in block 128, it is determined whether the list of entries built from the local contact database is empty. If so, a search is performed in the global contact database in block 130 to build a list of entries therefrom matching the search criteria. Next, in block 132, if the list is still empty, control returns to block 122 to wait for additional input from the user.

If either blocks 128 or 132 determine that the list is not empty, control passes to block 134 to determine the affinity rank for each entry in the list based upon the selected affinity criteria for the searching user.

Determining an affinity rank for each entry in the list is performed using a predetermined affinity criteria, which may be based on one or more factors. For example, as discussed above, an affinity criteria may be based upon one or more location and/or function identifiers. In addition to, or in the alternative to, the use of function and/or location identifiers, the determined affinity criteria may be based upon the contact affinity between the searching user and the users found in the search.

In this latter instance, affinity is determined based upon the number of contacts between the local user and the users found in the search. Contacts are typically monitored during certain operations performed in the electronic messaging system to determine the number of times certain activities occur with respect to a pair of users. Different types of contacts may be monitored, including the number of messages sent by the local user to the other users, the number of messages received from the other users by the local user, and the number of times the local user has searched for other users, among others.

Typically, block 134 is implemented by determining first what the predetermined affinity criteria is for the user. The predetermined affinity criteria may be set, for example, through a properties or preferences dialog box, or may not be user configurable. Moreover, only a subset of the affinity criteria discussed herein may be supported in other implementations.

If the selected affinity criteria is based at least in part on finctional affinity, one or more selected function identifiers for the local user are compared with those of the list entries, and a rank is determined for each list entry based upon the relative number of matches therebetween. Similarly, if the selected affinity criteria is based at least in part on location affinity, one or more selected location identifiers for the local user are compared with those of the list entries, and a rank is determined for each list entry based upon the relative number of matches therebetween. Also at this time, as discussed below in connection with FIG. 18, a message may be sent to a messaging manager to request affinity information about different locations to determine the relatedness of such locations based upon communications that occur between all users of such locations. Then, this returned information may also be used in the determination of an affinity rank for different users.

If the selected affinity criteria is based at least in part on contact affinity, the count stored in the contact table entry for each list entry is used in determining the affinity rank for each list entry. Moreover, if separate counts are used for different contact types (discussed below), one or more of such counts may be used in determining an affinity rank.

It should be appreciated that information from one or more of location identifiers, function identifiers, and numbers of contacts may be combined in a number of manners to generate composite scores that are used in ranking the list entries. Moreover, different factors may be separately scaled to favor certain factors over others. In the alternative, a hierarchical ranking process may be used, with ties broken by less important factors (e.g., rank entries by number of contacts, break ties based on facility, break remaining ties based on building, and break remaining ties on job title). It should be appreciated that various additional known manners of generally ranking different data elements based upon their proximity to another data element may be used in the alternative.

Once the affinity ranks for the list entries are determined, control passes from block 134 to block 136 to sort the list according to the affinity rank for each entry in the list. Then, based upon whether a "multiple names" option is enabled, block 138 passes control to either blocks 140 or 142.

The "multiple names" option is an optional setting that may be configured by a user to control whether the user receives all the favored entries, or only the most favored entry, among the subset of entries in the list. If the option is enabled, block 140 is executed to display the top N favored entries from the sorted list. If the "multiple names" option is not enabled, block 142 is instead executed to display only the top ranked entry in the list. In either event, upon completion of blocks 140 or 142, control returns to block 122 to process additional user input. It should also be appreciated that the multiple names setting may not be configurable by a user, so that either multiple names, or a single name, are always presented to a user.

Any number of user interface mechanisms may be utilized to display one or more entries from the list consistent with the invention. For example, as shown in FIG. 8, to display multiple list entries, a multiple entry display representation 154 (e.g., a combo box, a list box, a pop-up menu or drop-down menu, among others) may be displayed proximate an edit box 155 or other user interface control within which the search criteria is being input by a user. In the alternative, a separate panel may be displayed proximate an edit box, with the panel constantly displaying a portion of the database entries and being continually updated in response to changes to the search criteria. In either instance, a cursor (e.g., cursor 156) may highlight the most favored entry in the list. The cursor may be manipulated by a user to permit, for example, the user to select other entries in the list to select such alternate entry.

As shown in FIG. 9, to display only the most favored entry, a single entry display representation such as an edit box 158 or similar user interface control may be used. The edit box may be separate from, or more typically, the same control within which a user is inputting a search criteria. In addition, an "auto-complete" function may also be used to display within edit box 158 the remainder of the favored entry matching that search term (e.g., as illustrated at 159). The use of an "auto-complete" function is well known in the art, and thus, need not be discussed in greater detail herein. For example, if a user were to type in the letters "SMI" in an edit box, and the most favored entry was "Smith, John," an auto-complete function would add the letters "TH, JOHN" to the search term in the edit box, typically with the additional letters highlighted. Then, a user would be able to accept or reject the proposed user by either depressing the ENTER button to accept or depressing additional character keys to reject and modify the search term.

It should be appreciated that other user interface mechanisms known in the art may be utilized to display and/or highlight the favored entry relative to other entries retrieved from a search.

Now returning to block 124, once it is determined that a user has accepted the displayed name, control is passed to an update contact routine 142, prior to terminating and returning the accepted name as the result of the routine. Update contact routine 142 is generally used to track contacts between the local user and other users in the electronic messaging system so that the contact affinity therebetween may be determined. As such, one possible contact is that the local user has attempted to retrieve information about a particular user in a name lookup operation. Hence, update contact routine 142 is called in routine 110 in the illustrated embodiment.

Figure 10:
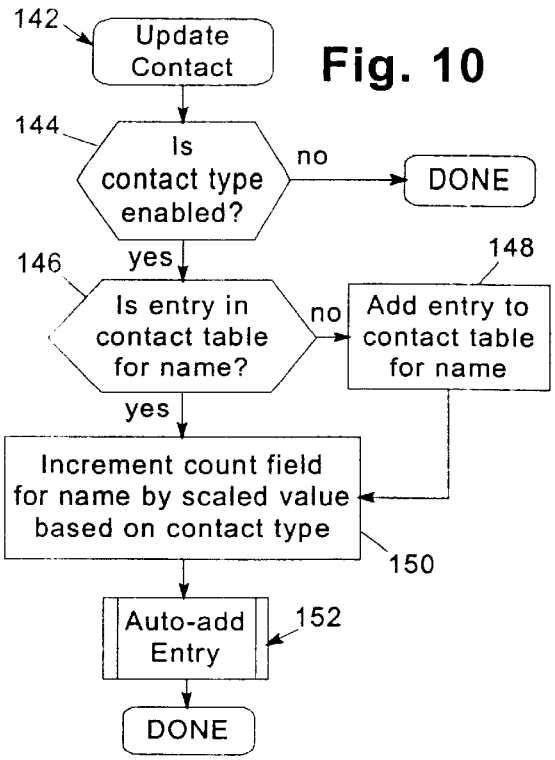
FIG. 10 is a flowchart illustrating the program flow of the update contact routine of FIG. 7.

Update contact routine 142 is illustrated in greater detail in FIG. 10. Routine 142 is implemented in the illustrated embodiment as a generic routine that receives as input a type of contact, as well as the name of the user with which the contact has been made. In the alternative, different routines for handling different types of contacts may be utilized, rather than a common routine.

The contact types supported in the illustrated embodiment are a "Send" contact, a "Receive" contact, a "Copy" contact, and a "Search" contact. The "Send" contact indicates that a message has been sent from the local user to another user in the electronic messaging system, with the other user indicated to be a primary recipient of the message. The "Receive" contact indicates that a message has ben received by the local user from another user in the electronic messaging system. The "Copy" contact indicates that the local user has sent a message in which the contacted user has been copied, e.g., by inclusion on a "carbon copy" or "CC" list, and optionally, on a "blind carbon copy", or "BCC" list. Finally, the "Search" contact indicates that the local user has search for, and accepted, the contacted user.

Routine 142 begins in block 144 by determining whether the contact type passed to the routine is enabled. This permits a user to set preferences or properties for the electronic messaging system as to whether or not the user wishes to track different types of contacts. In the alternative, the user may not be permitted the option of selecting one or more contacts, but must accept whichever combination of contacts is presented by the mail application, and thus, block 144 may be omitted in the alternative. Also, it should be appreciated that any number of combinations of contact types, including all or some of those mentioned above, as well as others not explicitly mention, may be monitored in this fashion.

If the contact type passed to the routine is enabled, control passes to block 146 to determine whether an entry exists in the contact table for the user name supplied to the routine. If no entries exist in the contact table for the name, an entry is added to the contact table in block 148, and control then passes to block 150. Returning to block 146, if an entry already exists in the contact table, block 148 is bypassed and control passes directly to block 150.

In block 150, the count field for the entry corresponding to the user name supplied to the routine is incremented by a scaled value representative of the contact type. For example, it may be determined that a "Send" contact indicates more of an affinity between users than a "Copy" or "Search" contact, whereby the incremental value therefor is greater than that for either of the latter contact types. In the alternative, each type of contact may be granted the same relative priority, whereby block 150 may merely increment the count by one whenever any contact occurs. As another alternative, separate counts may be maintained for different contact types, rather than being maintained as a composite number.

Next, an auto-add entry routine 152 is called to determine whether, as a result of the new contact, a new entry for the user name supplied to routine 142 should be automatically added to the local user's contact database. This routine is discussed in greater detail in connection with the automated entry addition feature described hereinafter.

Figure 11:
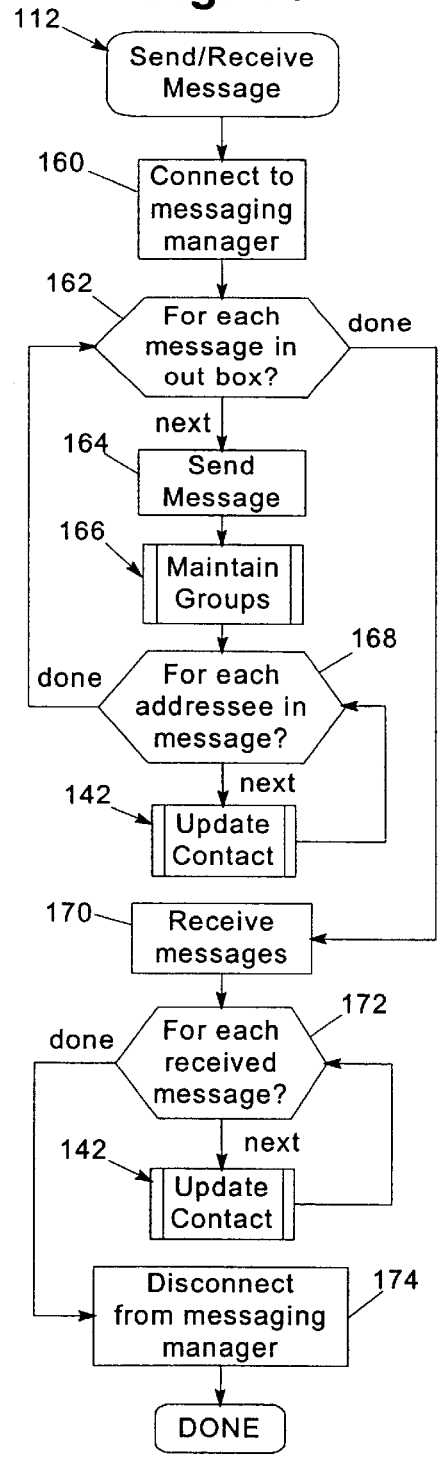
FIG. 11 is a flowchart illustrating the program flow of the send/receive message routine of FIG. 6.
Figure 16:
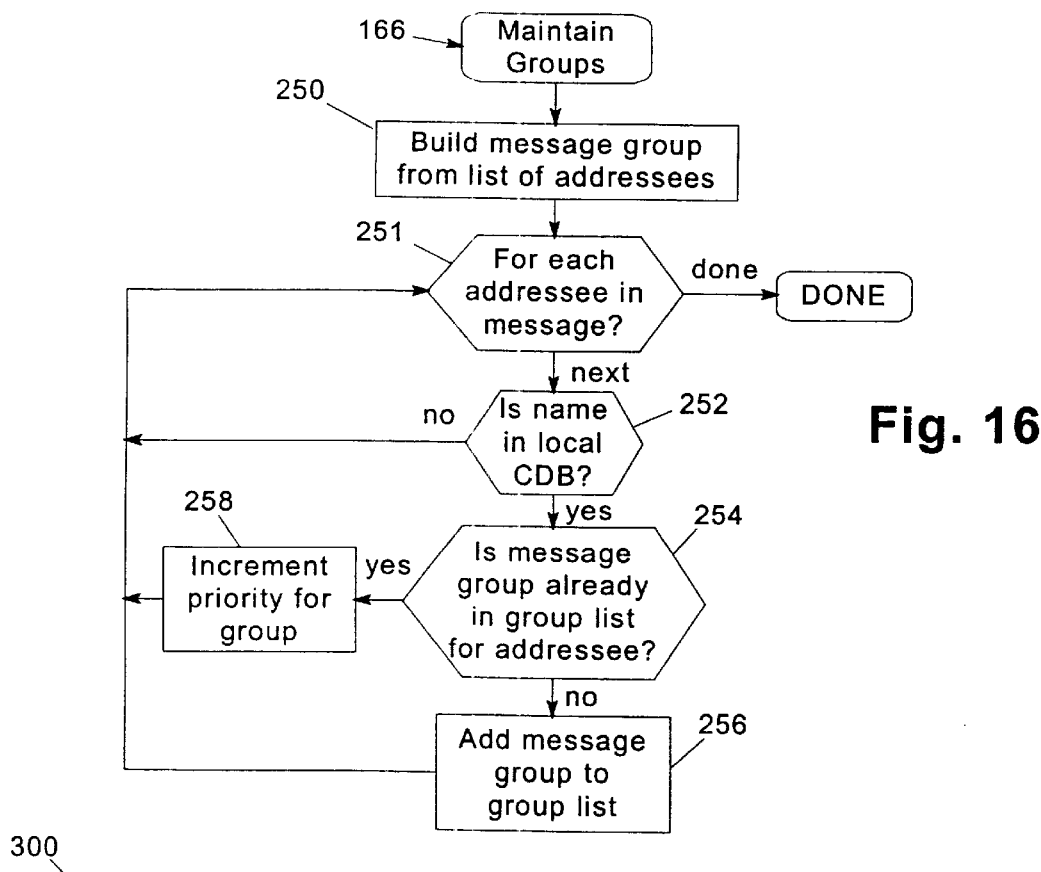
FIG. 16 is a flowchart illustrating the program flow of the maintain groups routine of FIG. 11.

As discussed above, update contact routine 142 may also be called to track other types of contacts consistent with the invention. Such other types of contacts are typically tracked during send/receive message routine 112, illustrated in greater detail in FIG. 11. Routine 112, which is initiated in response to a user's request to send and/or receive messages, begins in block 160 by connecting with the messaging manager in a manner well known in the art. Next, in block 162, a loop is initiated for processing each message that is pending in the out box for the local user. For each such message, block 162 passes control to block 164 to send the message in a manner well known in the art. Next, a maintain groups routine 166 is called to update any electronic messaging groups, in a manner that will be described below in connection with FIG. 16.

Next, block 168 performs another loop that calls update contact routine 142 for each addressee in the message that was just sent. It should be appreciated that, for each addressee, update contact routine 142 is passed the name of such addressee, as well as whether or not the addressee is a primary recipient or a copied recipient so that the update contact routine may distinguish between "Send" contacts and "Copy" contacts. In the alternative, it may be appreciated that the type of addressee may not be separately tracked, and thus, the "Copy" contact may not be used.

Returning to block 168, once the contacts for each addressee in the message have been processed, control is returned to block 162 to process each additional message in the out box. Once each message has been processed, block 162 passes control to block 170 to receive from the messaging manager all messages pending for the local user, in a manner well known in the art. Next, a loop is initiated in block 172 to call the update contact routine 142 for each received message, passing the name of the sender of each received message, as well as the contact type of "Receive", to routine 142 so that a contact is logged for the sender of each received message. Once each received message has been processed, block 172 then passes control to block 174 to disconnect from the messaging manager, whereby routine 112 is then complete.

It should be appreciated that the "Send/Receive" message functions may be implemented in other manners consistent with the invention. For example, rather than integrating these finctions into the same routine, different routines may be utilized to send and receive messages, respectively. In this instance, the send routine may be appended to a compose routine so that, once a user has completed the composition of a message, that message is automatically sent without any additional user input. Other modifications will become apparent to one of ordinary skill in the art.

Automated Addition of Entries to a Local Contact Database

Figure 12:
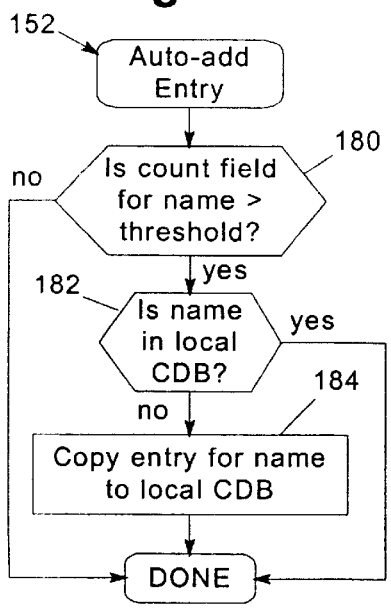
FIG. 12 is a flowchart illustrating the program flow of the auto-add entry routine of FIG. 10.

As discussed above, another intelligent contact management feature that may be implemented consistent with the invention is that of the automated addition of entries to a local contact database. This is typically performed in response to an accumulation of contacts between a pair of users exceeding a predetermined threshold. This feature is implemented in the illustrated embodiment in an auto-add entry routine 152, which is called upon completion of update contact routine 142 of FIG. 10. Auto-add entry routine 152 is illustrated in greater detail in FIG. 12.

Auto-add entry routine 152 is passed as input the user name being processed by update contact routine 142. In the alternative, routine 152 may be incorporated into routine 142, rather than utilizing a separate function. Moreover, as another alternative, routine 152 may be utilized to process all of the entries in the contact table at once and add any entries having count fields that exceed a predetermined threshold. In the latter instance, the routine would typically be called on a periodic basis, rather than directly by routine 142.

Routine 152 begins in block 180 by determining whether the count field for the entry in the contact table corresponding to the user name passed to the routine exceeds a predetermined threshold. If it does not, no further processing is required, and routine 152 terminates. If the count field is greater than the threshold, however, control passes to block 182 to determine whether or not the user name passed to the routine has an entry in the local contact database for the local user. If such an entry already exists, no further processing is required, and routine 152 terminates. However, if no such entry exists, control passes to block 184 to add an entry in the local contact database for the user by copying the corresponding entry from the master contact database. In the alternative, a new entry may be created in the local contact database with any corresponding fields blanked, thereby enabling the local user to input desired information into the new entry. However, by copying the existing information from the master contact database, the information pertaining to a particular user is synchronized with that stored in the master contact database.

After an entry is created in the local database, processing is complete, and routine 152 terminates.

The predetermined threshold with which the count field for a user is compared may be set to any number of values to control the frequency at which new entries are added to the local database via routine 152. It will be appreciated that, the higher the threshold, the more contacts are required between any pair of users prior to addition of a new entry to the local contact database. It should be appreciated that the threshold value may be configurable by a user, or may be fixed in the mail application. Moreover, it should also be appreciated that, rather than using a composite count, separate counts may be maintained for different contact types, whereby each count type could be compared to a separate threshold, and an entry created if any one count exceeded its corresponding threshold. Other alternatives will become apparent to one of ordinary skill in the art.

Automated Addressing of Electronic Messages

Yet another intelligent contact management feature that may be implemented consistent with the invention is that of the automated addressing of electronic messages. With this feature, in response to the local user addressing an electronic message to a particular user, a determination may be made as to whether the addressee user is a member of an electronic messaging group. If so, the message may be addressed to at least one additional member user in that group.

Figure 13:
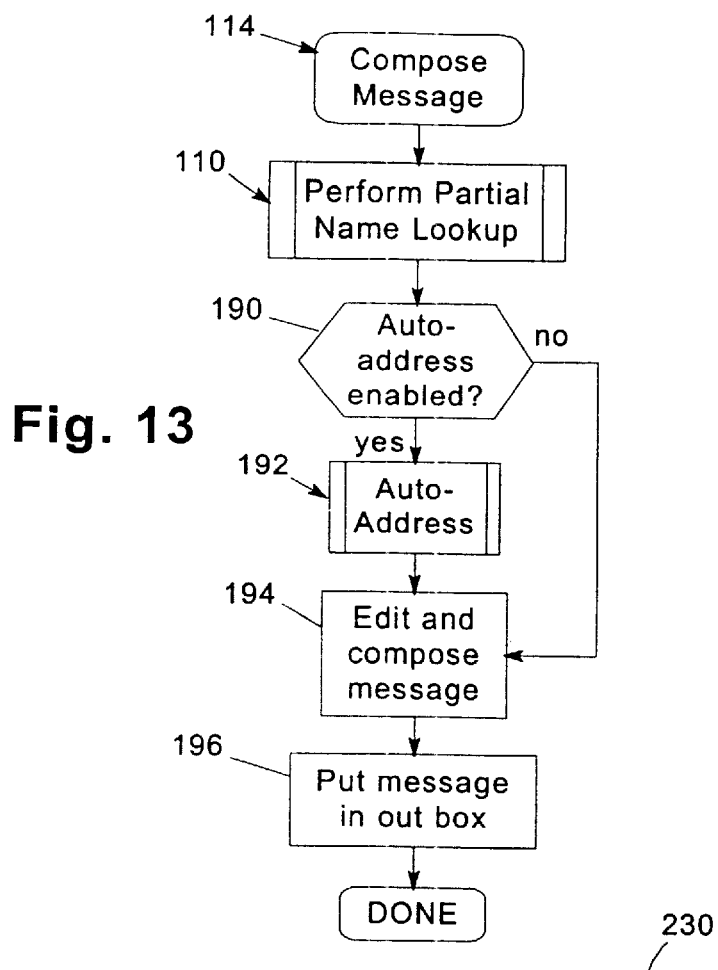
FIG. 13 is a flowchart illustrating the program flow of the compose message routine of FIG. 6.

Automated addressing of electronic messages may be implemented in the illustrated embodiment in a compose message routine 114, which is illustrated in greater detail in FIG. 13. The routine begins by calling perform partial name lookup routine 110 to retrieve one or more addressees for the message. Next, block 190 is called to determine whether the auto-address is enabled, indicating that a user has configured the mail application to permit additional users in groups to which a particular addressee is a member to be automatically added to the addressee list for the message. It should be appreciated that the use of auto-addressing may be mandatory in other embodiments, and as such, block 190 may be omitted if desired.

If auto-addressing is enabled, an auto-address routine 192 is called. Next, the message is edited and composed in block 194, and the message is placed in an out box in block 196, prior to terminating routine 114. Returning to block 190, if auto-addressing is not enabled, control passes directly to block 194, thereby bypassing the function call to routine 192.

It should be appreciated that the implementation illustrated in FIG. 13 for routine 114 generally follows the flow by which a user addresses and composes an electronic message. However, it should be appreciated that the various operations performed in routine 114 are typically performed in most mail applications using subroutines tied to different user controls on a dialog box. For example, function calls to perform partial name lookup routine 110 are typically performed in response to a user inputting addressee information into one or more edit boxes representing the addressee list for the message. Multiple edit boxes may be provided for different classes of recipients, e.g., primary recipients (e.g., a "TO:" list), copy recipients (e.g., in a carbon copy or cc list), and/or blind recipients (e.g., in a blind carbon copy or bcc list).

Moreover, the editing and composition of a message is typically tied to one or more editing windows that are open for a given message, with a multitude of editing functions being supported. During this attachments may also be added to a message, and various non-textual data may be attached or inserted into a message, e.g., image data, audio data, video data, etc.

In addition, the placing of a message in an out box is typically performed in response to a user depressing a "Send" or "Save" toolbar button, or an appropriate selection in a menu.

Thus, in a typical message composition process, a sequential flow similar to that of routine 114 will not be followed directly, but will be performed separately by different routines that implement the same basic functionality. The invention should therefore not be limited to the exemplary implementation illustrated in FIG. 13. Moreover, it should also be appreciated that routine 114 assumes that a single user is retrieved and processed as the addressee for the composed message. However, often multiple addressees may be manually input by a user, and as such, it should be appreciated that name lookup and auto-addressing routines 100 and 192 may be executed to retrieve and perform auto-addressing for each recipient user input by a local user. Moreover, it should be appreciated that additional functionality may be supported to coordinate the addressing of members of multiple groups to eliminate any duplicate user names from the address list for a message.

Figure 14:
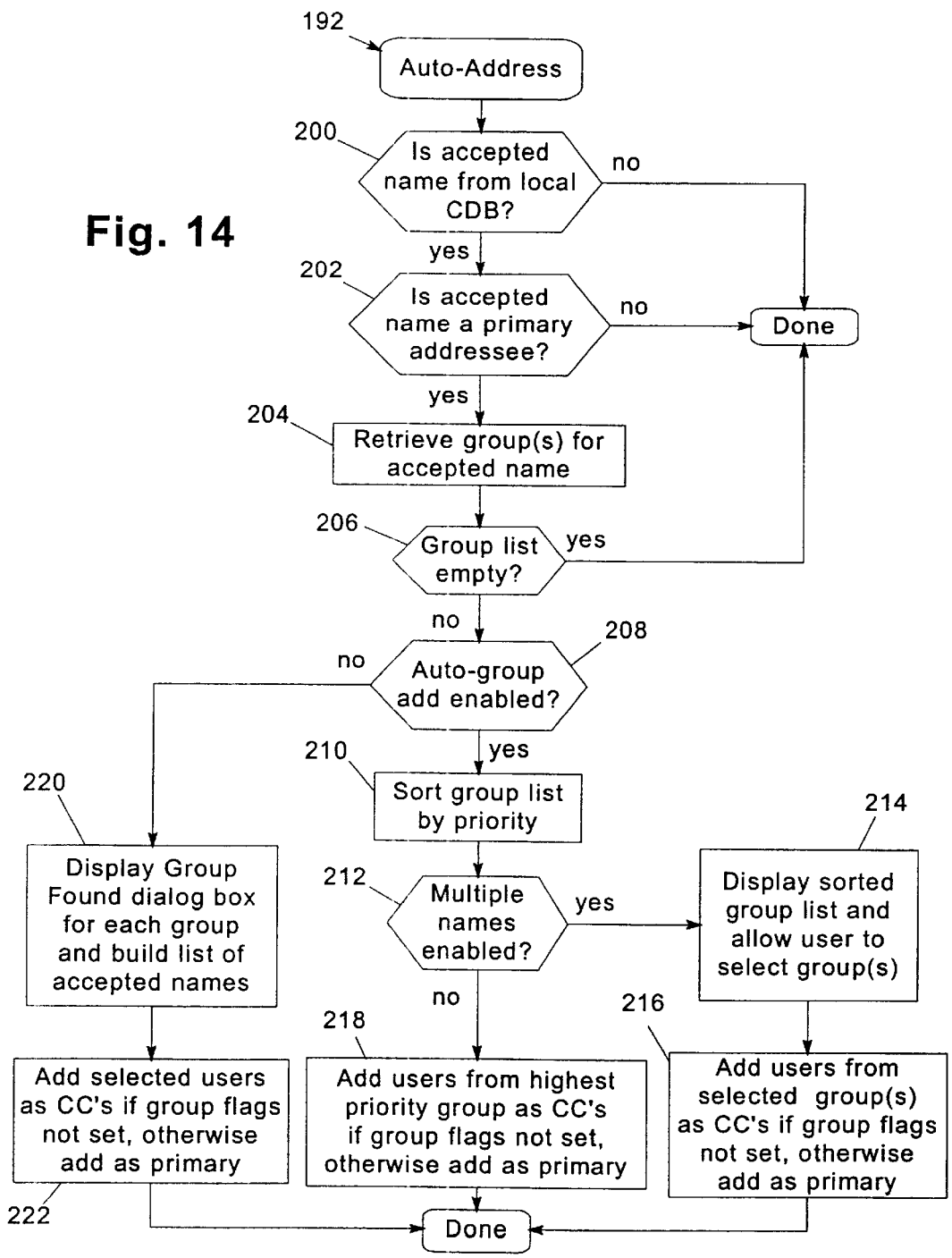
FIG. 14 is a flowchart illustrating the program flow of the auto-address routine of FIG. 13.

Auto-address routine 192 is illustrated in greater detail in FIG. 14. Routine 192 receives as input the accepted name for which it is desirable to determine whether additional addressees should be added based upon the group membership thereof.

Routine 192 begins in block 200 by determining whether the accepted name has an entry therefor in the local contact database. If not, no further processing is required, and routine 192 terminates. If, however, the accepted name does have an entry in the local contact database, control passes to block 202 to determine whether the accepted name is a primary addressee for the message. If not, routine 192 terminates. In the alternative, it should be appreciated that auto-addressing may be enabled for all types of addressees for a given message, and thus, block 202 may be omitted.

If the accepted name is a primary addressee, control passes to block 204 to retrieve a list of groups for the accepted name. This is typically performed by accessing the group list in the local contact database for the accepted name, then tracing through the linked list of groups to retrieve an identifier for each group. It should be appreciated that if no such facility is provided within each entry in the local contact database, block 204 may be implemented by searching through a list of groups for the local user to determine the membership of the accepted name therein.

Upon completion of block 204, control passes to block 206 to determine whether the group list built in block 204 is empty. If so, no further processing is required, and routine 192 terminates. If, however, the group list is not empty, control passes to block 208 to determine whether an "auto-group add" option has been enabled by a user.

The "auto-group add" option may be optionally set by a user in the preferences or properties of the mail application to determine whether or not the mail application asks the user to accept or reject the members of a group prior to addressing the message for those additional users.

First, assuming the option is enabled, control passes to block 210 to sort the group list based upon priority, e.g., by accessing the priority fields 86 for each group 82 (FIG. 4). As will be discussed below with reference to FIG. 16, each group has a priority that is incremented every time the group is utilized by a user, so that the messaging groups utilized more frequently by a particular local user will be prioritized relative to other less-frequently used groups.

Next, block 212 is executed to determine whether the "multiple names" option is enabled. Similar to block 138 in FIG. 7, block 212 may be omitted if such an option is not configurable by a user. If the "multiple names" option is enabled, control passes to block 214 to display a sorted group list and allow a user to select one or more of the groups in the list. If only one group is in the list, block 214 may also be bypassed in the alternative. Next, block 216 adds the users from the selected groups as carbon copies to the address list for the message if such users do not have their group flags set, otherwise, any users with group flags set therefor are added as primary recipients. Processing of routine 192 is then complete.

Returning to block 212, if the "multiple names" option is not enabled, control passes instead to block 218 to add each user from the highest priority group as either a carbon copy (if the group flag therefore is not set) or a primary recipient (if the group flag therefor is set and the group name is specified as a primary recipient), whereby processing of routine 192 is complete.

Returning to block 208, if the "auto-group add" option is not enabled, control passes instead to block 220 to display a group found dialog box for each group, which permits a user to build a list of accepted names from the membership of each group to which the addressee belongs. In response to user selection of one or more of the names, block 220 is executed to add those selected names as either carbon copies or primary recipients for the message, based upon the group flags thereof. Processing of routine 192 is then complete.

The program flows of blocks 214–216, 218, and 220–222 represent three alternative manners of automatically addressing a message based upon membership of an addressee in an electronic messaging group. It should be appreciated that any of these alternatives may be utilized alone or in combination with the others. Moreover, it should be appreciated that, when multiple groups are processed, it may be desirable to check the automated addressing for earlier groups during processing of later groups so that duplicate addressees are not created. Therefore, the invention should not be limited to the particular embodiment disclosed herein.

Figure 15:
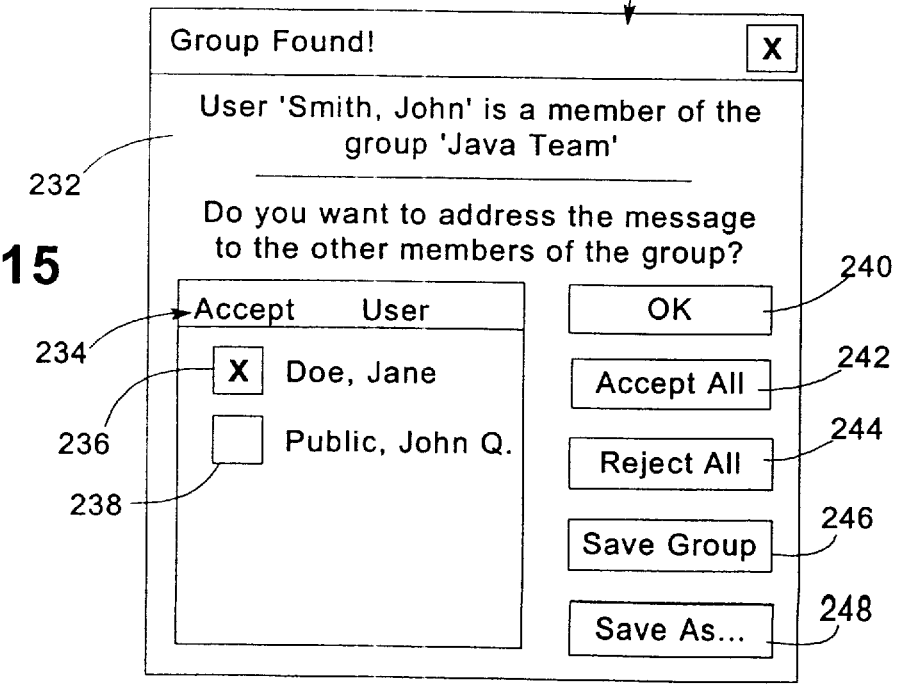
FIG. 15 is a block diagram of a group found dialog box used by the autoaddress routine of FIG. 14.

One suitable implementation of a group found dialog box is illustrated at 230 in FIG. 15. It should be appreciated that if multiple groups are present in the group list, multiple dialog boxes may be displayed in sequence, or in the alternative, a composite list of all the members of the groups for which the addressee is a member may be combined in the same dialog box.

Dialog box 230 includes a text message 232 that indicates the group that a particular addressee is a member of. For example, as shown in FIG. 15, if an addressee is "Smith, John" and that user is a member of the "Java Team" group with "Doe, Jane" and "Public, John Q.", the text message would indicate as such, and alert the user that the user has the option of addressing the message to the other members of the group.

Dialog box 230 also includes a display representation 234 of a list of the additional members of a group that the addressee is a member of. For example, for the "Java Team" group, the additional users are "Doe, Jane" and "Public, John Q.", and as such, display representation 234 includes a pair of check boxes 236, 238, which permit a user to accept or reject each of the additional members through user manipulation thereof.

A number of control buttons 240, 242, 244, 246 and 248 may also be provided. Control button 240 is an "OK" button that accepts only the additional members specified via the appropriate check boxes, and closes the dialog box. Control button 242 is an "Accept All" button that accepts all additional members as addressees for the message, and control button 244 is a "Reject All" button that rejects all additional members, essentially over-riding the auto-address feature. Control buttons 246 and 248 permit automated maintenance of the group, and are discussed separately below in connection with FIG. 17.

It should be appreciated that other user input mechanisms may be used to perform automated addressing in the manner described herein. Therefore, the invention should not be limited to the particular implementation described herein.

Automated Maintenance of Electronic Messaging Groups

Yet another intelligent contact management feature that may be implemented consistent with the invention is that of the automated maintenance of electronic messaging groups. In particular, electronic messaging groups may be created and/or updated based upon the addressing of an electronic message created by a local user.

The automated creation of new electronic messaging groups may be implemented in the illustrated embodiment in part in send/receive message routine 112 by calling a maintain groups routine 166 after each message is sent by the mail application. One suitable implementation of maintain groups routine 166 is illustrated in greater detail in FIG. 16. Routine 166 begins in block 250 by building a message group from the list of addressees for the message that was just sent. Then, in block 251, a FOR loop is initiated to process each addressee in the message. For each such addressee, block 252 is executed to determine whether an entry for the addressee exists in the local contact database. If not, control returns to block 251 to process the next addressee for the message. If, however, such an entry exists, control passes to block 254 to determine whether the message group is already present in the group list for the addressee, e.g., by proceeding through the linked list of groups in the entry in the local contact database. If the message group does not already exist, a new message group is automatically added to the group list in block 256. In addition, at this time it may or may not be desirable to prompt the user to input a group name so that the user may access the group at a later date. Control then returns to block 251 to process additional addressees in the message.

Returning to block 254, if the message group is already present in the group list for the addressee, control passes to block 258 to increment the priority value for the group, indicating an additional usage thereof, and prioritizing the group relative to other less-frequently used groups. Control then returns to block 251. Once each addressee in the message has been processed, block 251 terminates routine 166.

Figure 17:
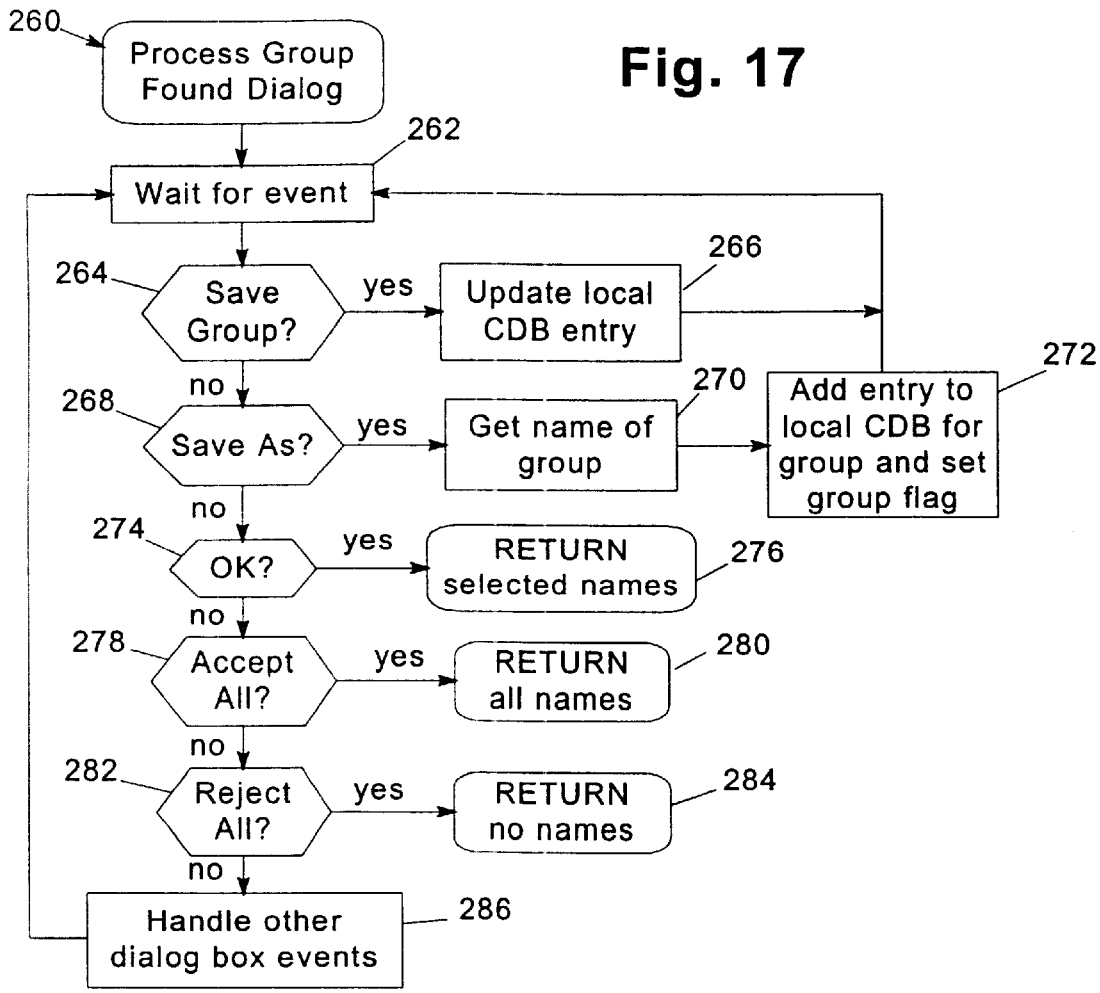
FIG. 17 is a flowchart illustrating the program flow of a process dialog box routine for the group found dialog box of FIG. 15.

Automated updating of an existing electronic messaging group may be supported, for example, as a component of the automated addressing operation described above, among other possible implementations. For example, FIG. 17 illustrates one implementation of a process group found dialog routine 260 that handles user input for group found dialog box 230 of FIG. 15. As shown in FIG. 17, routine 260 generally operates by waiting for events in block 262, and then processing those events as with a conventional event-driven model.

One relevant event is a "save group" event, which is detected at block 264, and is typically initiated as a result of user depression of "save group" control button 246 (FIG. 15). The save group event is processed in block 266 by updating the local contact database entry to replace the previous copy of the group being processed with the selected names in the dialog box. For example, depression of control button 246 with dialog box 230 in the configuration shown in FIG. 15 would result in the "Java Team" group being updated to include only members "Smith, John" and "Doe, Jane." Once the group is updated, control is returned to block 262. It will be appreciated that, as a component of such an operation, it may also be desirable to prompt the user to permit the user to decline to update the group if he or she so desires.

Returning to FIG. 17, another relevant event is a "save as" event, which is etected at block 268, and which is typically initiated in response to depression of "save as" control button 248 (FIG. 15). The save as event is processed by block 270 and 272, prior to returning control to block 262. In block 270, the user is prompted for the name of the new group to add to the local contact database. Then, in block 272 an entry is added for the new group, with the group flag set for the entry to indicate the entry as being for a group rather than an individual user.

Other events, discussed above with reference to automated message addressing, are detected in blocks 274, 278 and 282. Depression of OK button 240 (FIG. 15) is detected by block 274, resulting in the selected user names being returned from the dialog box, as well as closing of the dialog box, via block 276 (discussed above with reference to FIG. 15). Depression of accept all button 242 (FIG. 15) is detected by block 278, resulting in all the user names in the group being returned from the dialog box, as well as closing of the dialog box, via block 280 (also discussed above with reference to FIG. 15). Depression ofreject all button 244 (FIG. 15) is detected by block 282, resulting in none of the user names in the group being returned from the dialog box, as well as closing of the dialog box, via block 284 (also discussed above with reference to FIG. 15). Other events, not relevant to the invention, are detected and handled in block 286, which then returns control to block 262 to wait for additional events.

Other implementations may be developed to automatically maintain message groups consistent with the invention. Thus, the invention should not be limited to the particular implementation described herein.

Alternate Embodiments

Various modifications may be made to the embodiments described herein without departing from the spirit and scope of the invention. For example, electronic message groups may be treated in a similar manner to other addressees, with contact to and from those groups and a local user being monitored for contact affinity. In such an implementation, a message group could be added to a group list for a local user only after a contact affinity with the group exceeded a predetermined threshold.

In addition, in other embodiments users may be permitted to utilize multiple address books or other contact databases, and to use such address books selectively or in a composite fashion with the various features described herein. For example, a user may use separate address books to represent different categories of users, e.g., as pertaining to different jobs that the local user may have. Additional synchronization between such multiple contact databases may also be required.

As another example, as discussed above, one additional feature that may be implemented in an embodiment consistent with the invention is that of determining the relatedness of different locations, and using such relatedness in the determination of a location affinity between two users located at different locations. To implement such an embodiment, it may be desirable to monitor message traffic between different locations to determine the relatedness of different locations. The locations may be defined by any number of criteria, e.g., domain, network, facility, office, floor, etc. In the illustrated embodiment, location monitoring is performed by each messaging manager in an electronic messaging system, and thus the location is based upon the particular server, e.g., network or domain, to which the different users connect.

Figure 18:
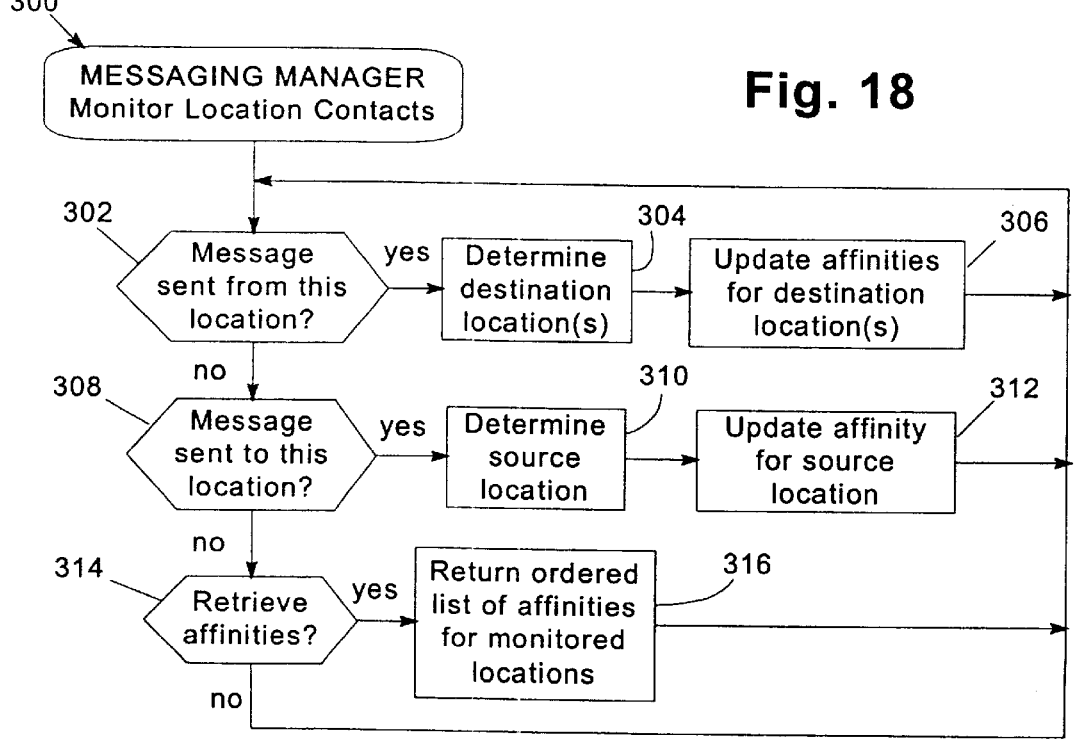
FIG. 18 is a flowchart illustrating the program flow of a monitor location contacts routine executed by a messaging manager in one of the servers of FIG. 3.

For example, as shown in FIG. 18, a monitor location contacts routine 300 may be executed by each messaging manager (e.g., messaging managers 64, 68 of FIG. 3) in an electronic messaging system to maintain location relation information. Routine 300 may be executed as a monitoring thread that executes periodically or continuously and updates location affinities for different locations related to a local location for a given messaging manager. The location affinities may be stored, for example, in an affinities table similar in arrangement to the contact table of FIG. 5, with a plurality of entries therein representing each location to which the local location for the messaging manager may be connected. Each entry may include a count that indicates the relative number of messages sent between all users of a local location and another location in the electronic messaging system.

Routine 300 detects several events. A first event, which is detected by block 302 of routine 300, is generated in response to a message being sent from the local location for the messaging manager to another location in the electronic messaging system. In response to this event, control is passed to block 304 to determine the destination location(s) for each addressee of the message—an operation that is often integral with the actual dispatching of a message to its recipients. Next, in block 306 the affinity for each destination location for the sent message is updated, e.g., by incrementing the count stored in the table entry corresponding to each destination location, and control then returns to block 302 to detect other events. It should be appreciated that, as with update contact routine 142, it may be necessary in block 306 to add a new entry for a destination location in the affinities table if no such entry already exists.

A second event, which is detected by block 308 of routine 300, is generated in response to a message being sent to (received by) the local location from another location in the electronic messaging system. In response to this event, control is passed to block 310 to determine the source location for the originator of the message, and then to block 312 to update the affinity for the source location in the affinity table (including adding a new entry if no such entry exists). Control then returns to block 302. It should be appreciated that, as with different contact types, it may be desirable to relatively scale the updates to the affinities for locations based upon whether messages were sent to or sent from a local location. Moreover, separate counts may be maintained in the alternative.

A third event, which is detected by block 314, is a retrieve affinities event generated by a mail application as a component of determining the affinities between different users. In response to this event, an ordered list of the affinities for all monitored locations is returned, whereby the mail application can determine the relatedness of two locations. This information may be considered by the mail application (e.g., during the determination of affinity ranks for retrieved search results during partial name lookup) so that, all other factors being equal, users in more related locations may be favored more than users in other locations.

Various additional modifications to the embodiments described herein will become apparent to one of ordinary skill in the art. Therefore, the invention lies in the claims hereinafter appended.

What is claimed is:

1. A computer-implemented method of maintaining a contact database, the method comprising:

(a) accumulating a number of contacts between a first user and a second user; and (b) in response to the number of contacts between the first user and the second user exceeding a predetermined threshold, adding an entry associated with the second user to a contact database associated with the first user.

2. The method of claim 1, wherein adding the entry includes copying information from a second entry associated with the second user and stored in a master contact database.

3. The method of claim 2, wherein accumulating the number of contacts includes at least one of monitoring messages sent by the first user to the second user, monitoring message received by the first user from the second user, monitoring messages sent by the first user that copy the second user, and monitoring attempts by the first user to retrieve information about the second user.

4. The method of claim 3, further comprising determining whether the number of contacts between the first user and the second user exceed the predetermined threshold by comparing the predetermined threshold with a composite number of at least two of the messages sent by the first user to the second user, the messages received by the first user from the second user, the messages sent by the first user that copy the second user, and the attempts by the first user to retrieve information about the second user.

5. The method of claim 4, wherein determining whether the number of contacts between the first user and the second user exceed the predetermined threshold includes determining the composite number by scaling at least one of the number of messages sent by the first user to the second user, the number of messages received by the first user from the second user, the number of messages sent by the first user that copy the second user, and the number of attempts by the first user to retrieve information about the second user.

6. The method of claim 3, further comprising determining whether the number of contacts between the first user and the second user exceed the predetermined threshold by separately comparing at least one of the number of messages sent by the first user to the second user, the number of messages received by the first user from the second user, the number of messages sent by the first user that copy the second user, and the number of attempts by the first user to retrieve information about the second user, to an individual threshold.

7. A computer-implemented method of maintaining electronic messaging groups, the method comprising:

(a) addressing an electronic message to a plurality of recipient users in response to user input; and (b) automatically creating a new electronic messaging group that includes the plurality of recipient users.

8. The method of claim 7, wherein automatically creating the new electronic messaging group is performed in response to user input to send the electronic message.

\* \* \* \* \*